United States Patent
Berg et al.

(10) Patent No.: US 7,334,658 B2
(45) Date of Patent: Feb. 26, 2008

(54) STEERING SYSTEM WITH JOYSTICK MOUNTED CONTROLS

(75) Inventors: Torsten Berg, Steina (DE); Knuth Kressin, Regensburg (DE); Thomas Spindler, Schwandorf (DE); Thorsten Parketny, Schwandorf (DE)

(73) Assignee: Caterpillar Inc., Peoria, IL (US)

( * ) Notice: Subject to any disclaimer, the term of this patent is extended or adjusted under 35 U.S.C. 154(b) by 467 days.

(21) Appl. No.: 11/019,298

(22) Filed: Dec. 23, 2004

(65) Prior Publication Data

US 2006/0137931 A1    Jun. 29, 2006

(51) Int. Cl.
*B60K 26/00*    (2006.01)
(52) U.S. Cl. ...................... 180/333; 180/334
(58) Field of Classification Search ............... 180/333, 180/332, 326, 315, 6.2, 6.24; 414/685
See application file for complete search history.

(56) References Cited

U.S. PATENT DOCUMENTS

| | | | |
|---|---|---|---|
| 3,362,247 A | 1/1968 | Watts | |
| 4,140,200 A | 2/1979 | Tucek | |
| 4,158,968 A | 6/1979 | Wilson et al. | |
| 4,175,638 A | 11/1979 | Christensen | |
| 4,291,896 A | 9/1981 | Koch | |
| 4,392,546 A | 7/1983 | Brown et al. | |
| 4,523,488 A | 6/1985 | Ahrendt | |
| 4,706,776 A | 11/1987 | Hyoki et al. | |
| 4,798,099 A | 1/1989 | Alexander et al. | |
| 4,978,273 A | 12/1990 | Radke et al. | |
| 5,042,314 A * | 8/1991 | Rytter et al. ................... 74/335 |
| 5,086,870 A * | 2/1992 | Bolduc ....................... 180/333 |
| 5,215,158 A | 6/1993 | Pedersen | |
| 5,261,291 A * | 11/1993 | Schoch et al. ............ 74/484 R |
| 5,360,312 A | 11/1994 | Mozingo | |
| 5,533,590 A | 7/1996 | Steffen et al. | |

(Continued)

FOREIGN PATENT DOCUMENTS

CA    2288572    6/2000

(Continued)

OTHER PUBLICATIONS

Volvo Wheel Loaders, L330E, "50 tons of muscle and brains," pp. 1-20; printed from www.volvoce.com in 2004.

(Continued)

*Primary Examiner*—Paul N. Dickson
*Assistant Examiner*—Tiffany L. Webb
(74) *Attorney, Agent, or Firm*—Finnegan, Henderson, Farabow, Garrett & Dunner

(57) ABSTRACT

A steering system is provided for a work machine. The steering system may include at least one hand-operated work implement control device and a steering mechanism configured to control a direction of travel of the work machine. The system may also include a first steering device operatively coupled to the steering mechanism and configured to control at least one component of the steering mechanism based on operator input. The system may further include a second steering device mounted on the work implement control device. The second steering device may be configured to be selectively operatively coupled to the steering mechanism to thereby control a direction of travel of the work machine based on lateral movement of the second steering device relative to the work implement control device.

37 Claims, 3 Drawing Sheets

U.S. PATENT DOCUMENTS

| | | | |
|---|---|---|---|
| 5,553,992 A | | 9/1996 | Ashcroft |
| 5,562,175 A | | 10/1996 | Björsne et al. |
| 5,566,586 A | * | 10/1996 | Lauer et al. ............... 74/523 |
| 5,790,101 A | * | 8/1998 | Schoch et al. ............. 345/161 |
| H1851 H | | 6/2000 | Kelley et al. |
| 6,152,239 A | * | 11/2000 | Kelley et al. ............... 172/4.5 |
| 6,152,676 A | * | 11/2000 | Evert et al. ............... 414/631 |
| 6,408,977 B1 | | 6/2002 | Obertrifter et al. |
| 6,425,729 B1 | * | 7/2002 | Coutant ...................... 414/685 |
| 6,523,636 B2 | | 2/2003 | Chatterjea |
| 6,550,562 B2 | * | 4/2003 | Brandt et al. ............... 180/333 |
| 6,729,647 B2 | | 5/2004 | Shapiro et al. |
| 6,892,481 B2 | * | 5/2005 | Yamamoto et al. ........... 37/348 |
| 2003/0037985 A1 | * | 2/2003 | Jeppe et al. ................ 180/333 |
| 2005/0279561 A1 | * | 12/2005 | Shearer et al. .............. 180/333 |

FOREIGN PATENT DOCUMENTS

| | | |
|---|---|---|
| DE | 4314616 | 3/1994 |
| WO | WO 03/020571 | 3/2003 |
| WO | WO 03/020572 | 3/2003 |

OTHER PUBLICATIONS

Volvo Construction Equipment Walkaround, Wheel Loaders L330E, Comfort Drive Control (1 page); printed from www.volvoce.com in 2004.

The Volvo L180E in detail, 5 pages; printed from www.volvoce.com in 2004.

Volvo Wheel Loaders, L330E (Quickspecs/Features, 9 pages; printed from www.volvoce.com in 2004).

U.S. Appl. No. 10/872,731; filed Jun. 22, 2004.

* cited by examiner

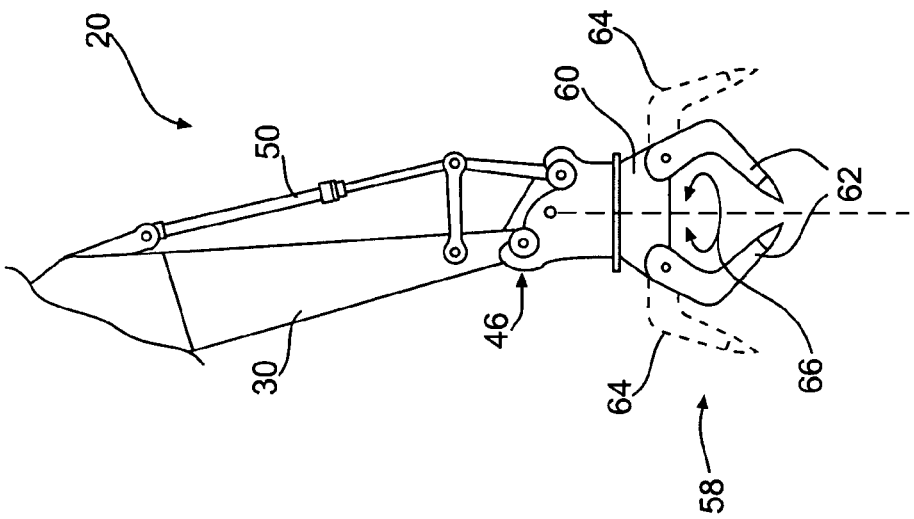
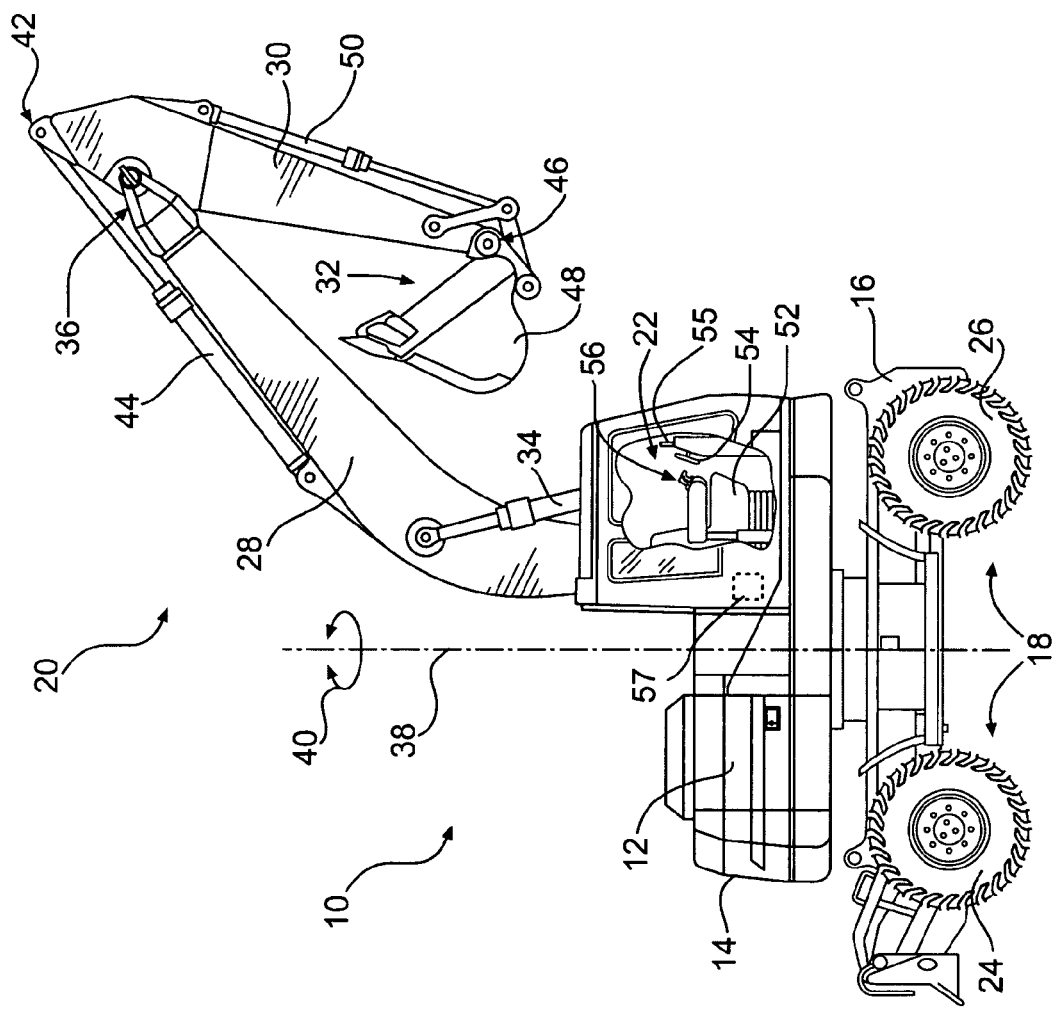

STEERING SYSTEM WITH JOYSTICK MOUNTED CONTROLS

TECHNICAL FIELD

The present disclosure is directed to a steering system for a work machine, and more particularly to a steering system with joystick mounted controls for a work machine.

BACKGROUND

Work machines can have many functions and, therefore, may have many control devices. For example, work machines may have many levers, buttons, switches, pedals, etc. that may be manipulated in order to control the different functions of the work machine. In addition, some machines may also include separate steering input devices. In many cases, the steering input device may be a steering wheel, particularly if the work machine is capable of higher ground speeds (e.g., machines configured to travel between worksites). A steering wheel, while providing adequate control at higher speeds, can be difficult to use when simultaneously operating other control devices.

Systems have been developed that consolidate steering controls and controls of other machine functions into multifunction levers (e.g., joysticks). While some systems have been configured to control steering with movement of the joystick (e.g., side to side), others have been configured to control steering with separate control devices mounted on the joysticks. For example, U.S. Statutory Invention Registration No. H1,851 published Jun. 6, 2000 (hereinafter referred to as "the '851 publication") discloses a steering system wherein steering is controlled by buttons mounted on a joystick.

While the system of the '851 publication may be suited for use on some types of work machines, such as motor graders, other types of work machines may benefit from a system that can provide additional steering control and sensitivity. Further, the system of the '851 publication is not configured to control multiple functions with the joystick mounted buttons.

The present disclosure is directed to one or more improvements in existing work machine steering systems.

SUMMARY OF THE INVENTION

In one aspect, the present disclosure is directed to a steering system for a work machine. The steering system may include at least one hand-operated work implement control device and a steering mechanism configured to control a direction of travel of the work machine. The system may also include a first steering device operatively coupled to the steering mechanism and configured to control at least one component of the steering mechanism based on operator input. The system may further include a second steering device mounted on the work implement control device. The second steering device may be configured to be selectively operatively coupled to the steering mechanism to thereby control a direction of travel of the work machine based on lateral movement of the second steering device relative to the work implement control device.

In another aspect, the present disclosure is directed to a steering system for a work machine. The steering system may include at least one hand-operated work implement control device and a steering mechanism configured to control a direction of travel of the work machine. The system may also include a first steering device operatively coupled to the steering mechanism and configured to control at least one component of the steering mechanism based on operator input. The system may further include a multifunction input device mounted on the at least one work implement control device. The multifunction input device may be configured to be selectively operatively coupled to the steering mechanism to thereby control a direction of travel of the work machine. The multifunction input device may also having two or more selectable modes of operation and may be configured to operate, in at least one of the modes of operation, as a second steering device that controls a direction of travel of the work machine.

In another aspect, the present disclosure is directed to a work machine, having a frame mounted on a base. The work machine may include a controllable work implement including a work tool operatively attached to the frame via a boom and a stick, and the frame may be configured to rotate relative to the base. The work machine may further include a steering mechanism configured to control a direction of travel of the work machine. In addition, the work machine may include a steering wheel operatively coupled to the steering mechanism and configured to control at least one component of the steering mechanism based on operator input. Further, the work machine may include at least one hand-operated work implement control device operatively coupled to the work implement and configured to control movement thereof. Also, the work machine may include a multifunction input device mounted on the work implement control device. The multifunction input device may be configured to be selectively operatively coupled to the steering mechanism to thereby control directional movement of the at least one traction device based on lateral movement of the multifunction input device relative to the work implement control device. The multifunction input device may include two or more selectable modes of operation and, in at least one of the modes of operation, may be operatively coupled to the steering mechanism and being configured to operate as a second steering device that controls a direction of travel of the work machine.

In another aspect, the present disclosure is directed to a method of steering a work machine. The method may include operating a steering device operatively coupled to a steering mechanism to control a direction of travel of the work machine. The method may also include activating a secondary steering system by selectively operatively coupling a multifunction input device to the steering mechanism. The multifunction input device may be mounted on a hand-operated work implement control device configured to control movement of a work implement. The method may further include operating the multifunction input device in a first mode of operation to control a direction of travel of the work machine. In addition, the multifunction input device may be selectively operatively coupled to at least one component of a system configured to perform an alternative function of the work machine. Also, the method may include operating the multifunction input device in a second mode of operation to control the alternative function of the work machine.

BRIEF DESCRIPTION OF THE DRAWINGS

FIG. 1A is a diagrammatic illustration of a work machine according to an exemplary disclosed embodiment.

FIG. 1B is a diagrammatic illustration of a portion of a work implement having an auxiliary work tool mounted thereto according to an exemplary disclosed embodiment.

DETAILED DESCRIPTION

Figures 2A, 2B, 2C:
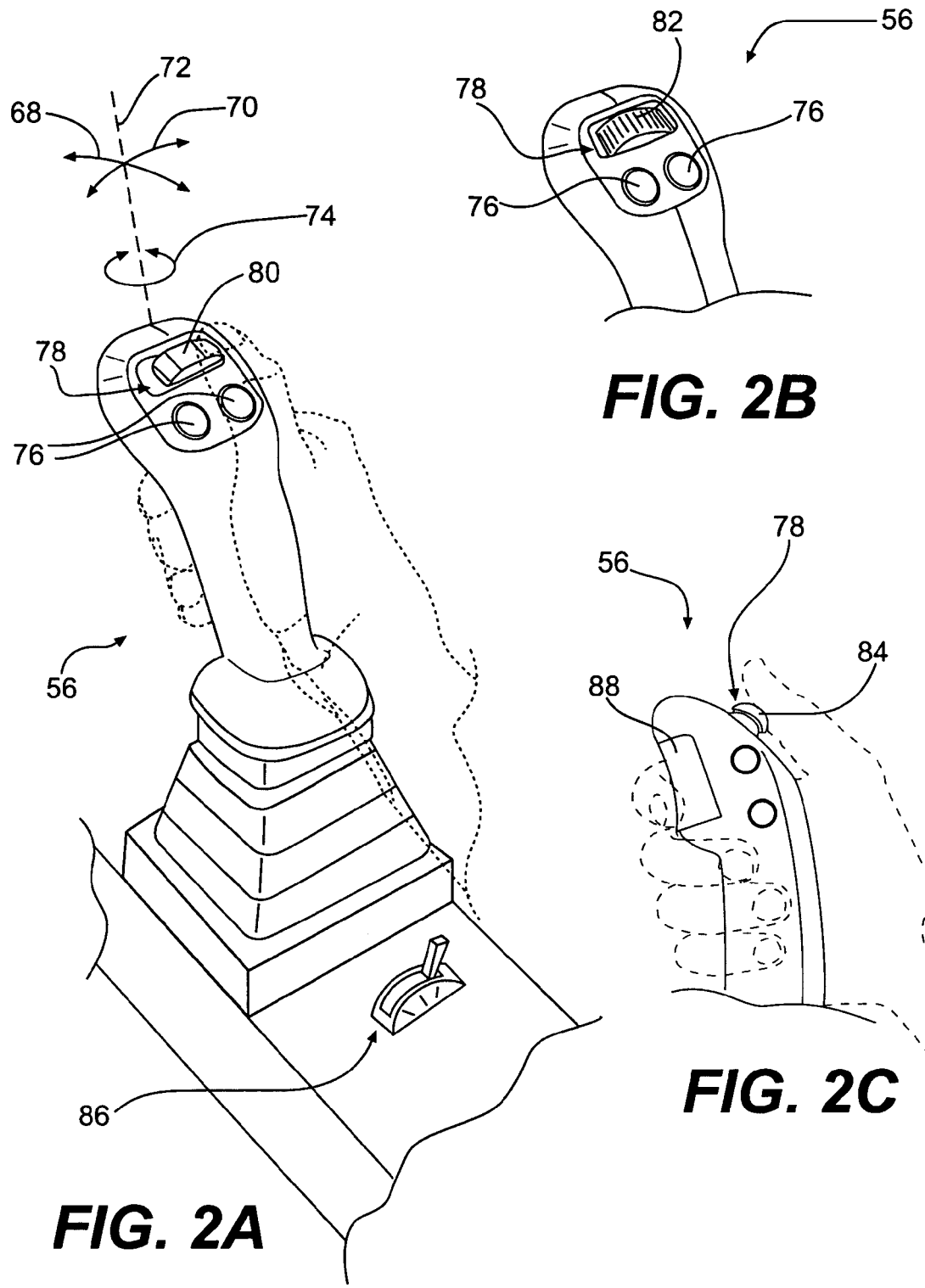
FIG. 2A is a diagrammatic illustration of a steering control device according to an exemplary disclosed embodiment.
FIG. 2B is a diagrammatic illustration of a steering control device according to another exemplary disclosed embodiment.
FIG. 2C is a diagrammatic side view illustration of a steering control device according to another exemplary disclosed embodiment.

Reference will now be made in detail to the drawings. Wherever possible, the same reference numbers will be used throughout the drawings to refer to the same or like parts.

FIG. 1A shows a work machine 10. Work machine 10 may include a power source 12, and a frame 14, which may be operably attached to a base 16. Work machine 10 may also include a traction system 18, which may be operably attached to base 16. In addition, work machine 10 may include a work implement 20 and an operator station 22 from which work implement 20 may be controlled.

Work machine 10, although shown in FIG. 1 as a wheeled excavator, may be any type of work machine with operator-controlled steering. For example, work machine 10 may include wheel loaders, motor graders, backhoe loaders, skid steers, track type tractors, tracked excavators, and any other type of work machine with operator-controlled steering.

Frame 14 may be fixedly mounted on base 16. Alternatively, frame 14 may be rotatably mounted on base 16. As yet another alternative, frame 14 may be mounted to base 16 in a slidable fashion or any other configuration. In addition, work machine 10 may include a cab riser function, by which frame 14 may be raised and lowered relative to base 16. Alternatively or additionally, the cab riser function may cause operator station 22 to be raised and lowered relative to frame 14. The cab riser function may be hydraulically actuated.

Traction system 18 may include at least one traction device, such as, for example, a first set of wheels 24 and a second set of wheels 26, as shown in FIG. 1A. At least one set of wheels may be steerable. Work machine 10 may be configured with two wheel or four wheel steering. Further, the steering configuration may be selectable between two wheel and four wheel steering or the operator may switch which set of wheels is steerable.

While traction system 18 has been shown to include wheels, the present disclosure may also apply to work machines with one or more endless tracks and/or belts, or any other type of traction device. In addition, the present disclosure may apply to steering systems that vary a steering angle of one or more traction devices, as well as skid steer, and differential steering systems. Further, these systems may each apply to work machines with a variety of types of traction devices. For example, while track type work machines are commonly configured with skid steer or differential steering systems, they may alternatively, or additionally be configured with steering systems that vary a steering angle of one or more of tracks. Similarly, wheeled work machines may steer with a variable steering angle system, skid steer, and/or differential steering systems.

Work implement 20 may be any type of work implement and may include any type of work tool, such as, for example, a bucket, blade, grapple, jackhammer, shears, etc. As shown in FIG. 1A, work implement 20 may include a boom 28, a stick 30, and a work tool 32 attached to the end of stick 30. Boom 28 may be pivotally attached to frame 14. A boom actuator 34 may be attached to frame 14 and boom 28, such that a distal end 36 of boom 28 may be raised and lowered by actuation of boom actuator 34.

Distal end 36 of boom 28 may also be moved side-to-side. In the embodiment shown, boom 28 may be moved side to side by rotation of frame 14 relative to base 16 about an axis 38 in a direction indicated by an arrow 40. For purposes of this disclosure, this side-to-side movement of work implement 20 via rotational movement of frame 14 relative to base 16 shall be referred to as "swing." Work machine 10 may also include an offset boom function by which boom 28 may be pivoted side-to-side relative to frame 14.

Stick 30 may be pivotally attached to boom 28 at a proximal end 42. A stick actuator 44 may be attached to boom 28 and stick 30 such that actuation of stick actuator 44 may cause stick 30 to extend and retract with respect to boom 28 in the manner of a jackknife. That is, a distal end 46 of stick 30 may be extended further away from frame 14 and retracted closer to frame 14 by actuating stick actuator 44.

Work tool 32 may be attached to distal end 46 of stick 30. While work tool 32 has been illustrated in FIG. 1A as a bucket 48, work tool 32 may be any type of work tool. Work tool 32 may be pivotally attached to distal end 46 of stick 30. A work tool pivot actuator 50 may be attached to stick 30 and work tool 32 such that actuation of work tool pivot actuator 50 may cause work tool 32 to pivot relative to stick 30.

Operator station 22 may be a cab, as illustrated in FIG. 1A, and may be attached to or integral with frame 14. Operator station 22 may include an operator seat 52, a first steering device, such as, for example, a steering wheel 54, a display 55, and at least one hand-operated work implement control device 56 (e.g., a joystick). Steering wheel 54 may be operatively coupled to first set of wheels 24 and/or second set of wheels 26 so as to control their directional movement. Steering wheel 54 may tilt and/or telescope relative to operator seat 52 in order to facilitate ingress and egress or to provide a more open cab while operating other control devices. For example, steering wheel 54 may be tilted and/or telescoped out of the way while a secondary steering control system is active. Work machine 10 may include two of work implement control devices, one on each side of operator seat 52.

Display 55 may be located at any suitable place on work machine 10, such as on a dashboard in operator station 22, as shown in FIG. 1A. Display 55 may be a monitor screen such as, for example, a cathode ray tube (CRT), liquid crystal display (LCD), or plasma monitor, and may display indications of whether joystick steering is active. Display 55 may include one or more indicator lights that may illuminate to provide such information. Display 55 may also display additional information, indicators, warnings, and/or instructions. Work machine 10 may also include an audible alert device 57 configured to sound audible alerts as appropriate. Audible alert device 57 may be located at any suitable location on work machine 10, such as, for example, in close proximity to operator station 22.

Work implement control device 56 may control multiple functions of work machine 10, such as, for example, operation of work implement 20 (including movements of boom 28, stick 30, and work tool 32), swing, propulsion of work machine 10, steering, the cab riser function, the offset boom function, etc.

Boom actuator 34, stick actuator 44, and work tool pivot actuator 50 may be any kind of actuators, such as, for example, hydraulic cylinders as shown in FIG. 1A. Each hydraulic cylinder may be associated with its own hydraulic circuit in order to be independently controlled.

Some work tools, such as bucket 48, may have a single actuator, and thus may be controlled by a single hydraulic circuit. Other types of work tools, such as grapples, may include more than one actuator, and thus may be controlled by more than one hydraulic circuit. For example, grapples may be controlled by two or more hydraulic circuits. One circuit may control work tool pivot actuator 50, which may pivot the grapple in the same manner as it does bucket 48. Additionally, a second circuit may control an auxiliary function, such as rotation of the grapple.

Work tool 32 may be interchangeable with at least one auxiliary work tool 58, as shown in FIG. 1B. Although auxiliary work tool 32 may be any kind of work tool, it has been shown as a grapple 60. Grapple 60 may include two or more jaws 62 that may open and close, as indicated by a set of dashed outlines 64. In addition, work tools, such as grapple 60, may be rotatable as indicated by an arrow 66.

FIG. 2A illustrates an exemplary embodiment of work implement control device 56. Work implement 20 may be controlled by fore-aft movements of work implement control device 56, as indicated by an arrow 68, and/or lateral movements of work implement control device 56, as indicated by another arrow 70. Work implement 20 may also be controlled by rotational movements of work implement control device 56 about an axis 72, through the length of work implement control device 56, as indicated by an arrow 74. In addition, one or more movements of work implement 20 may be controlled by one or more other types of input devices, such as foot pedals (not shown).

As shown in FIG. 2A, work implement control device 56 may include additional input devices mounted thereon, such as, for example, buttons 76 and/or a multifunction input device 78. Where work machine 10 includes more than one work implement control device 56, each may include the same configuration of input devices or each may have a different input device configuration. Further, each work implement control device 56 may control a unique set of functions. For example, each work implement control device 56 may include a multifunction input device 78 configured to control a set of functions different from those controlled by multifunction input devices on other work implement control devices. Alternatively, all or some multifunction input devices on other work implement control devices may be configured to control the same function or functions, giving an operator an option as to which multifunction input device to use.

Multifunction input device 78 may be operably moved in a lateral fashion to effect control of various functions of work machine 10. Multifunction input device 78 may be any suitable kind of input device, such as, for example, a thumb slider 80, as shown in FIG. 2A or a thumbwheel 82 (see FIG. 2B). Alternatively, multifunction input device 78 may be a hat switch 84 (see FIG. 2C), which may be described as a "mini joystick," operable with one's thumb.

Multifunction input device 78 may include a self-centering feature. Multifunction input device 78 may be configured to control steering of work machine 10 and thus serve as a second steering device. Although described below as being configured to control multiple functions, in certain embodiments, multifunction input device 78 may be configured to control steering only.

Multifunction input device 78 may be configured such that a degree of lateral movement of multifunction input device 78 may correspond to the speed at which the steering angle of first set of wheels 24 and/or second set of wheels 26 changes. That is, the further the multifunction input device 78 is pushed to one side or the other, the faster the wheels may turn.

Alternatively, multifunction input device 78 may be configured such that a degree of lateral movement of multifunction input device 78 may correspond to the amount by which the steering angle deviates from center. That is, each increment of lateral movement of multifunction input device 78 may result in a corresponding change in steering angle. In such embodiments, the correlation may be linear or non-linear. In embodiments where the correlation is linear, each incremental movement of multifunction input device 78 may result in the same degree of steering angle change. In embodiments where the correlation is non-linear, the degree of steering angle change associated with incremental movements of multifunction input device 78 may vary depending on how far multifunction input device 78 is pushed to one side. For example, incremental movements of multifunction input device 78 made near the center of its range of motion may result in relatively smaller steering angle changes, whereas the same types of incremental movements of multifunction input device 78 made near the far left or far right of its range of motion may result in relatively larger steering angle changes.

Also, the system may be configured such that the wheels come back to center when multifunction input device is brought back to center. Alternatively, the system may be configured such that the wheels do not come back to center when multifunction input device is brought back to center. For example, once the wheels are turned to the right by movement of multifunction input device 78 to the right of center, the wheels may remain turned to the right until multifunction input device 78 is moved to the left of center.

Multifunction input device 78 may include multiple modes of operation such that a different set of functions is controlled in each mode of operation. The modes of operation may be selectable with a mode selector switch 86. Multifunction input device 78 may be configured with as many modes of operation as desired. FIG. 2A shows an exemplary embodiment, wherein thumb slider 80 may be configured with three modes of operation. Mode selector switch 86 may be any suitable type of switch, such as, for example a multi-position switch, as shown in FIG. 2A. Each position of mode selector switch 86 may correspond to one of the modes of operation.

In at least one mode of operation, multifunction input device 78 may be configured to control steering of work machine 10, as discussed above. In another mode of operation, multifunction input device 78 may be configured to control an auxiliary function of work machine 10. For example, moving mode selector switch 86 may change the operation of multifunction input device 78 from steering control to control of auxiliary work tool 58. In yet another mode of operation, multifunction input device 78 may be configured to control the cab riser function or offset boom function.

Work implement control device 56 may also include a trigger switch 88, as shown in FIG. 2C. Trigger switch 88 may be configured to temporarily toggle the configuration of multifunction input device 78 between steering control and control of an auxiliary function of work machine 10. For example, when operating multifunction input device 78 in steering mode, an operator may temporarily switch the configuration of multifunction input device 78 over to control of the auxiliary function, without having to operate mode selector switch 86.

Figure 3:
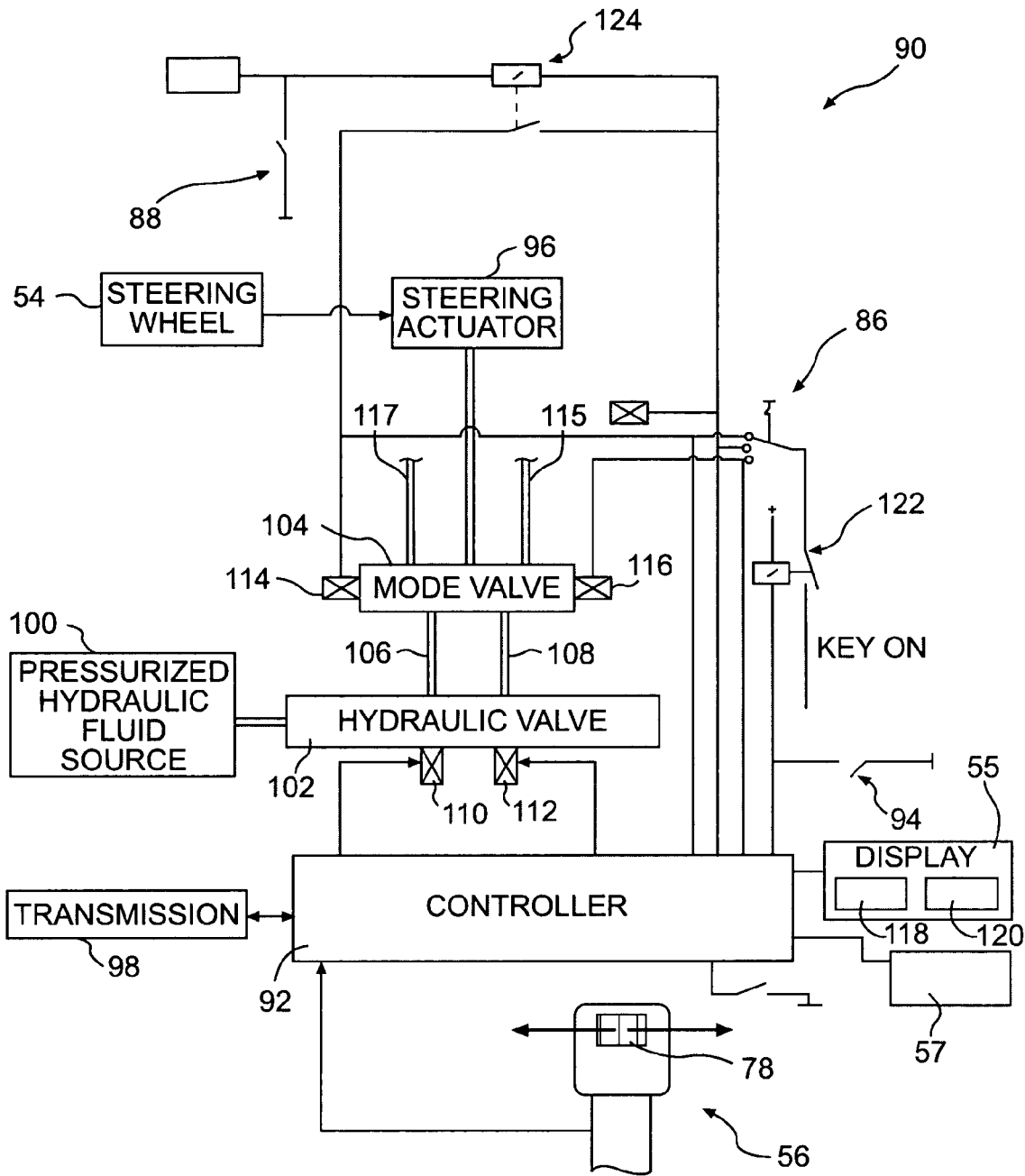
FIG. 3 is a schematic illustration of a steering system according to an exemplary disclosed embodiment.

FIG. 3 provides a schematic representation of an exemplary steering control system 90. System 90 may include a controller 92, which may be configured to receive inputs from multifunction input device 78. System 90 may also include other input devices, such as, for example, steering wheel 54, mode selector switch 86, trigger switch 88, and an implement lockout switch 94. Controller 92 may control operation of one or more devices, such as, for example, display 55, audible alert device 57, a steering actuator 96, and a transmission 98. Further, system 90 may also include hydraulic componentry such as, for example, a pressurized hydraulic fluid source 100, a hydraulic valve 102, and a mode valve 104.

Steering actuator 96 may be any suitable type of actuator for effecting changes in steering angle. For example, steering actuator 96 may include one or more hydraulic cylinders, electric motors, or any other suitable actuation device. Accordingly, controller 92 may be operatively coupled to steering actuator 96 with any suitable type of system, such as, for example, a hydraulic system (as shown in FIG. 3), an electrical system, or any other suitable type of system. Steering actuator 96 may be configured to receive steering commands from steering wheel 54 if joystick steering (i.e., steering with joystick-mounted multifunction input device 78) is inactive, and from multifunction input device 78 if joystick steering is active.

In addition, steering control using a particular steering input device may be prioritized over another steering input device. For example, steering inputs made with steering wheel 54 may override steering inputs made with multifunction input device 78 or vice versa.

Controller 92 may receive an input signal from multifunction input device 78 and produce one or more corresponding output signals. For example, multifunction input device 78 may produce a pulse width modulation (PWM) signal corresponding to the degree to which multifunction input device 78 is moved in a lateral direction. Alternatively, multifunction input device 78 may produce another kind of signal, such as a simple voltage or a current which may be received and or processed by controller 92. Controller 92 may produce any kind of output signal, including, for example, PWM, voltage, current, or any other suitable type of signal.

The output signals from controller 92 may control hydraulic valve 102, which may be configured to regulate flow of hydraulic fluid from pressurized hydraulic fluid source 100 to one or more actuators of work machine 10. Pressurized hydraulic fluid source 100 may include, for example, a hydraulic pump. In certain embodiments, system 90 may include a left hydraulic line 106 and a right hydraulic line 108. The output signals from controller 92 may control a left solenoid 110 associated with left hydraulic line 106 and/or a right solenoid 112 associated with right hydraulic line 108. For example, in response to movement of multifunction input device 78 to the left, controller 92 may activate left solenoid 110, which may actuate hydraulic valve 102, in order to supply pressurized hydraulic fluid for a particular function of work machine 10.

In certain embodiments, left hydraulic line 106 and right hydraulic line 108 may each be associated with a particular set of movements. For example, when system 90 is configured to control steering, left hydraulic line 106 may be associated with turning the wheels to the left, whereas right hydraulic line 108 may be associated with turning the wheels to the right. Similarly, when system 90 is configured to control rotation of grapple 60, left hydraulic line 106 may be associated with rotation of grapple 60 to the left, whereas right hydraulic line 108 may be associated with rotating grapple 60 to the right. Further, when system 90 is configured to control a cab riser function, left hydraulic line 106 may be associated with upward movement of the cab, whereas right hydraulic line 108 may be associated with downward movement of the cab. Further still, when system 90 is configured to control an offset boom function, left hydraulic line 106 may be associated with rotation of boom 28 to the left, whereas right hydraulic line 108 may be associated with rotation of boom 28 to the right.

Mode selector switch 86 may be configured to select which of several functions may be controlled by the multifunction input device 78. Setting mode selector switch 86 to a first position may configure system 90 such that multifunction input device 78 controls auxiliary work tool 58. For example, in the first position, mode selector switch 86 may enable battery power to energize an auxiliary work tool solenoid 114 associated with mode valve 104. Auxiliary work tool solenoid 114 may actuate mode valve 104 to thereby permit flow of hydraulic fluid to auxiliary work tool 58 via a hydraulic line 115. Setting mode selector switch 86 to a second (or "neutral") position may enable joystick steering by configuring system 90 such that multifunction input device 78 controls steering actuator 96. When mode selector switch 86 is in this second position, mode valve 104 may be in a default position wherein no solenoids are acting on it. Setting mode selector switch 86 to a third position may configure system 90 such that multifunction input device 78 controls the hydraulic cab riser function. For example, in the third position, mode selector switch 86 may enable battery power to energize a cab riser solenoid 116 associated with mode valve 104. Cab riser solenoid 116 may actuate mode valve 104 to thereby permit flow of hydraulic fluid for a the hydraulic cab riser function via a hydraulic line 117. Alternatively, the third mode may be used to control an offset boom function. Other embodiments may include additional modes, wherein the offset boom function is controllable in one of these additional modes.

System 90 may also include various alert devices associated with the operating status of system 90. For example, display 55 may include indicator lights to inform an operator whether joystick steering is active and/or when joystick steering is activated and/or deactivated. In particular, system 90 may include a first indicator light 118 configured to illuminate when joystick steering is active and a second indicator light 120 configured to illuminate when joystick steering is inactive. First indicator light 118 may illuminate upon activation of joystick steering, and may remain illuminated until joystick steering is deactivated. Alternatively, first indicator light 118 may remain illuminated for a predetermined period of time after activation of joystick steering, such as, for example, three seconds. Second indicator light 120 may illuminate upon deactivation of joystick steering. Second indicator light 120 may remain illuminated until joystick steering is activated. Alternatively, second indicator light 120 may remain illuminated for a predetermined period of time after deactivation of joystick steering, such as, for example, three seconds.

System 90 may also include audible alert device 57 configured to produce audible alerts to inform an operator and/or any other person who is on, in, or around work machine 10 that one or more events has occurred and/or one or more conditions exist. Audible alert device 57 may produce any type of audible sound, such as, for example, bells, chimes, electronic beeps, or any other appropriate sounds. For example, audible alert device 57 may sound an audible alert upon activation and/or deactivation of joystick steering.

An indication of which mode has been selected with mode selector switch 86 may be communicated to controller 92. For example, for each position of mode selector switch, a separate electrical connection may be made to controller 92. These connections may allow battery power to be connected to controller 92 via different inputs depending on which position of mode selector switch 86 has been selected. Controller 92 may be configured to determine which mode has been selected by recognizing which input is communicating battery power.

Controller 92 may also produce different output signals to various components depending on which mode has been selected. For example, controller 92 may cause first indicator light 118 to be illuminated when joystick steering has been activated, as discussed above, whereas controller 92 may cause second indicator light 120 to be illuminated when joystick steering is deactivated.

Further, controller 92 may be configured to vary its output signal or signals to left solenoid 110 and right solenoid 112 based on which mode is selected. For example, controller 92 may amplify the input signal from multifunction input device 78 more for joystick steering function than for control of auxiliary work tool 58, or vice versa. Controller 92 may be configured to change its output signals in any suitable manner in response to mode selection.

In addition, in some embodiments, work machine 10 may be configured such that only first gear may be used when joystick steering is active. In such embodiments, controller 92 may prevent transmission 98 from engaging gears above first gear when joystick steering is active. Alternatively or additionally, when transmission 98 is operating in a gear higher than first gear, controller 92 may prevent activation of joystick steering.

Information about which gear transmission 98 is in may be sensed at transmission 98 and communicated back to controller 92. Alternatively, controller 92 may dictate gear selection. Such embodiments could omit a transmission sensor because the gear selection information would already be internal to controller 92.

Further, work machine 10 may be configured such that it may travel above a predetermined ground speed only when joystick steering is inactive. In such embodiments, controller 92 may prevent work machine 10 from exceeding a predetermined rate of travel when joystick steering is active. Alternatively or additionally, when work machine 10 is traveling above a predetermined rate of travel, controller 92 may prevent activation of joystick steering.

Implement lockout switch 94, when open, may restrict operations of one or more functions of work machine 10, particularly those of work implement 20. Some or all movements of work implement 20 may be prevented when implement lockout switch 94 is open. In addition, steering control using multifunction input device 78 may also be restricted and/or disabled by implement lockout switch 94. The function of implement lockout switch 94 may be augmented by an implement lockout relay 122.

Trigger switch 88 may be operable, when joystick steering is active, to temporarily enable control of auxiliary work tool 58 with multifunction input device 78, as discussed above. The function of trigger switch 88 may be augmented by a trigger relay 124. For example, when trigger switch 88 is pressed, trigger relay 124 may close to thereby enable battery power to activate auxiliary work tool solenoid 114, despite mode selector switch 86 being positioned to activate joystick steering.

While mode selector switch 86, trigger switch 88, and implement lockout switch 94 have been discussed and illustrated as passive switches, simply closing an electrical circuit, these switches could also be active switches. For example, these switches could produce their own signal which may be communicated to controller 92.

INDUSTRIAL APPLICABILITY

The disclosed system may be applicable to any kind of work machine where it may be desired to consolidate control devices. For example, the disclosed system may be applicable to work machines having one or more hand-operated control devices regularly used during operation of the machine, such as, for example, work implement control devices.

Although the disclosed system may be applicable to a variety of different types of work machines, it may be particularly useful in wheeled excavators. For example, wheeled excavators may significantly benefit from the disclosed system because they can have a large number of operator-controlled actuators. Thus, a large number of input devices may be used to control the actuators. While operating a large number of input devices, such as work implement control devices, an operator may find it difficult to operate a separate steering wheel.

Wheeled excavators are relatively mobile machines. Due to this mobility, it may be practical for them to relocate from place to place within a work site fairly frequently if desired. While a steering wheel may function to control steering in these situations, using the steering wheel to control steering on a frequent basis may interrupt an operator's course of action by forcing him to take his hands off of the work implement control devices. The convenience of having steering controls incorporated into the work implement control devices may provide the operator with a more efficient and/or more relaxed working environment.

In addition, excavation using wheeled excavators may be primarily performed with the excavator in a stationary position. Therefore, whenever the excavator is moved, it may be for getting from one area of a work site to another, rather than being part of an actual excavation. Under such operating conditions, steering inputs may be more substantial than just minor steering corrections. Thus, a self-centering slider, thumbwheel, hat switch, or the like, may enable an operator to more smoothly control steering because they may be more intuitive than, for example, a set of push buttons.

Further, it may also be more intuitive, during operation of a wheeled excavator, for the steering control system to be configured such that the rate of steering angle change corresponds to the amount of lateral movement of a steering control device. This may provide an operator with more intuitive and specific control of steering. Sliders, thumbwheels, and hat switches lend themselves well to this configuration, whereas pushbuttons may not be as well-suited for it. In addition, the fact that inputs may be made to multifunction input device 78 with lateral movements may also be intuitive, because one can readily associate leftward movement with turning the wheels to the left, and rightward movement with turning the wheels to the right.

The disclosed system may also have advantages over joystick steering systems where the steering control is performed by movement of the joystick itself (e.g., with lateral movement). By having a separate control device mounted on the joystick, the disclosed system may provide the benefit of having steering control integrated into a work implement control device (i.e., consolidation of control devices) without taking up a main control movement of the joystick (e.g., fore-aft, side-to-side, or rotational movement).

It will be apparent to those skilled in the art that various modifications and variations can be made to the disclosed steering system with joystick mounted controls without departing from the scope of the invention. Other embodiments of the invention will be apparent to those skilled in the art from consideration of the specification and practice of the invention disclosed herein. It is intended that the specification and examples be considered as exemplary only, with a true scope of the invention being indicated by the following claims and their equivalents.

What is claimed is:

1. A steering system for a machine, comprising:
at least one hand-operated work implement control device;
a steering mechanism configured to control a direction of travel of the machine;
a first steering device operatively coupled to the steering mechanism and configured to control at least one component of the steering mechanism based on operator input; and
a second steering device mounted on the work implement control device, the second steering device being configured to be selectively operatively coupled to the steering mechanism to thereby control a direction of travel of the machine based on lateral movement of the second steering device relative to the work implement control device.

2. The steering system of claim 1, wherein the steering mechanism includes at least one traction device, the first steering device being operatively coupled to the at least one traction device and configured to control directional movement of the at least one traction device; and
the second steering device being configured to be selectively operatively coupled to the at least one traction device to thereby control directional movement of the at least one traction device based on lateral movement of the second steering device relative to the work implement control device.

3. The steering system of claim 2, wherein the at least one traction device includes at least one of a wheel and an endless track.

4. The steering system of claim 2, wherein an amount by which the second steering device is laterally moved corresponds to a rate of directional movement of the at least one traction device.

5. The steering system of claim 2, wherein an amount by which the second steering device is moved laterally corresponds to an amount of directional movement of the at least one traction device.

6. The steering system of claim 1, wherein the second steering device includes a self-centering feature.

7. The steering system of claim 1, wherein the second steering device is selected from the group consisting of a thumb slider, a thumbwheel, and a hat switch.

8. The steering system of claim 1, wherein the second steering device and the work implement control device are simultaneously operable.

9. The steering system of claim 1, wherein the first steering device includes a steering wheel.

10. The steering system of claim 9, wherein the steering wheel is configured to tilt and/or telescope relative to an operator seat of the machine.

11. The steering system of claim 1, wherein steering inputs made with the first steering device override steering inputs made with the second steering device.

12. The steering system of claim 1, wherein the second steering device is configured to function in at least one alternative mode of operation in which it controls one or more functions of the machine other than the steering mechanism.

13. The steering system of claim 1, further including a display configured to indicate whether the second steering device is operatively coupled to the steering mechanism.

14. The steering system of claim 1, further including an audible alert device configured to indicate operative coupling or decoupling of the second steering device to the steering mechanism.

15. The steering system of claim 1, wherein an operability of the second steering device to control steering is related to a rate of travel of the machine.

16. The steering system of claim 15, wherein operative coupling of the second steering device to the steering mechanism is prevented when the machine is traveling above a predetermined rate of travel of the machine.

17. The steering system of claim 15, wherein operative coupling of the second steering device to the steering mechanism is prevented when the machine is traveling in a gear higher than a predetermined gear.

18. The steering system of claim 1, wherein traveling above a predetermined rate of travel is prevented when the second steering device is operatively coupled to the steering mechanism.

19. The steering system of claim 1, wherein engaging a gear higher than a predetermined gear is prevented when the second steering device is operatively coupled to the steering mechanism.

20. The steering system of claim 19, wherein the predetermined gear is first gear.

21. A steering system for a machine, comprising:
at least one hand-operated work implement control device;
a steering mechanism configured to control a direction of travel of the machine;
a first steering device operatively coupled to the steering mechanism and configured to control at least one component of the steering mechanism based on operator input; and
a multifunction input device mounted on the at least one work implement control device, the multifunction input device being configured to selectively operatively coupled to the steering mechanism to thereby control direction of travel of the machine, the multifunction input device also having two or more selectable modes of operation and being configured to operate, in at least one of the modes of operation, as a second steering device that controls a direction of travel of the machine.

22. The steering system of claim 21, wherein the steering mechanism includes at least one traction device, the first steering device being operatively coupled to the at least one traction device and configured to control directional movement of the at least one traction device; and
the multifunction input device being configured to be selectively operatively coupled to the at least one traction device to thereby control directional movement of the at least one traction device.

23. The steering system of claim 21, wherein the multifunction input device is configured to control a function of an auxiliary work tool in at least one of the modes of operation.

24. The steering system of claim 21, further including a switch mounted on the work implement control device, the switch being configured to operatively couple the multifunction input device with the auxiliary work tool while a mode of operation is selected in which the multifunction otherwise configured to operate as a second steering device.

25. The steering system of claim 21, wherein the multifunction input device is configured to control, in at least one of the modes of operation, at least one of a hydraulic cab riser function and an offset boom function.

26. The steering system of claim 21, further including a switch configured to select between the two or more modes of operation of the multifunction input device.

27. The steering system of claim 21, wherein the second steering device is selected from the group consisting of a thumb slider, a thumbwheel, and a hat switch.

28. A machine, comprising:
a frame mounted on a base;
a controllable work implement including a work tool operatively attached to the frame via a boom and a stick, the frame being configured to relative to the base;
a steering mechanism configured to control a direction of travel of the machine;
a steering wheel operatively coupled to the steering mechanism and configured to control at least one component of the steering mechanism based on operator input;
at least one hand-operated work implement control device operatively coupled to the work implement and configured to control movement thereof; and
a multifunction input device mounted on the work implement control device, the multifunction input device being configured to be selectively operatively coupled to the steering mechanism to thereby control directional movement of the at least one traction device based on lateral movement of the multifunction input device relative to the work implement control device;
the multifunction input device having two or more selectable modes of operation and, in at least one of the modes of operation, being operatively coupled to the steering mechanism and being configured to operate as a second steering device that controls a direction of travel of the machine.

29. The machine of claim 28, wherein the steering mechanism includes at least one traction device, the first steering device being operatively coupled to the at least one traction device and configured to control directional movement of the at least one traction device; and
the multifunction input device being configured to be selectively operatively coupled to the at least one traction device to thereby control directional movement of the at least one traction device based on lateral movement of the second steering device relative to the work implement control device.

30. The machine of claim 28, wherein the multifunction input device includes a self-centering feature and is selected from the group consisting of a thumb slider, a thumbwheel, and a hat switch.

31. The machine of claim 28, wherein operability of the multifunction input device to control steering is conditional upon a rate of travel of the work machine.

32. A method of steering a machine, comprising;
operating a steering device operatively coupled to a steering mechanism to control a direction of travel of the machine;
activating a secondary steering system by selectively operatively coupling a multifunction input device to the steering mechanism, the multifunction input device being mounted on a hand-operated work implement control device configured to control movement of a work implement;
operating the multifunction input device in a first mode of operation to control a direction of travel of the machine;
selectively operatively coupling the multifunction input device to at least one component of a system configured to perform an alternative of the machine; and
operating the multifunction input device in a second mode of operation to control the alternative function of the work machine.

33. The method of claim 32, wherein operating the steering device and the multifunction input device to control a direction of travel of the machine includes controlling directional movement of at least one traction device of the machine.

34. The method of claim 32, further including operating the multifunction input device while simultaneously using the work implement control device to control the work implement.

35. The method of claim 32, wherein the steering device includes a steering wheel, and further including tilting the steering wheel out of the way while the secondary steering system is active.

36. The method of claim 32, further including limiting a rate of travel of the machine when the secondary steering system is active.

37. The method of claim 32, further including preventing use of transmission gears higher than a predetermined gear when the second steering system is active.

* * * * *

UNITED STATES PATENT AND TRADEMARK OFFICE
CERTIFICATE OF CORRECTION

PATENT NO. : 7,334,658 B2 Page 1 of 1
APPLICATION NO. : 11/019298
DATED : February 26, 2008
INVENTOR(S) : Berg et al.

It is certified that error appears in the above-identified patent and that said Letters Patent is hereby corrected as shown below:

On the Title Page, Item (56)

Please correct the References Cited as follows:
Page 2, item (56), under "Other Publications", in Column 2, Line 8, delete "10/872,731;" and insert -- 10/872,431; --.

Please correct the Claims as follows:
Column 12, line 52, in claim 21, after "configured to" insert -- be --.

Column 12, line 53, in claim 21, after "control" insert -- a --.

Column 13, line 9, in claim 24, after "multifunction" insert -- input device is --.

Column 13, line 25, in claim 28, after "configured to" insert -- rotate --.

Column 14, line 28, in claim 32, after "alternative" insert -- function --.

Signed and Sealed this

Seventh Day of July, 2009

JOHN DOLL
*Acting Director of the United States Patent and Trademark Office*